United States Patent [19]

Perham

[11] 4,326,420
[45] Apr. 27, 1982

[54] KERF PRESSURE PLATE MATERIAL TESTER

[76] Inventor: Roscoe E. Perham, Ledge La., Lebanon, N.H. 03766

[21] Appl. No.: 195,821

[22] Filed: Oct. 10, 1980

[51] Int. Cl.³ .............................................. G01L 1/02
[52] U.S. Cl. ...................................... 73/768; 73/784; 73/862.58
[58] Field of Search ............. 73/768, 784, 820, 862.58

[56] References Cited
U.S. PATENT DOCUMENTS 2,336,500  12/1943  Osterberg ............................... 73/784
3,427,876  2/1969  Steele et al. ............................. 73/784

Primary Examiner—Anthony V. Ciarlante
Attorney, Agent, or Firm—Darrell E. Hollis

[57] ABSTRACT

A material tester of minimal thickness is provided. A thin metal plate has in one surface an annular groove, and within the groove the plate thickness is reduced, to an amount less than the groove depth. A flexible diaphragm extends over the central part of the plate and over the groove, and is clamped to the plate by an annular ring overlying the groove. Passages extend in the plate from an edge to a chamber defined by the diaphragm and the central portion of the plate. A supporting structure including a handle is attached to the plate, and conduits extend between passages in the handle and the passages in the plate.

11 Claims, 6 Drawing Figures

KERF PRESSURE PLATE MATERIAL TESTER

BACKGROUND OF THE INVENTION

The present invention relates to apparatus for sensing pressure in a body of material.

Apparatus for testing the pressure within materials, through use of an expansible chamber device, are well known. In general, a suitable fluid is supplied to the chamber of the expansible device, and the pressure of that fluid is measured, in order to determine the pressure in the material in which the device is placed.

Among the devices heretofore known is that shown in Steele et al. U.S. Pat. No. 3,427,876, which is a device of some five inches in thickness and includes a support plate having a pressure plate joined to it, the plates being disclosed as being, for example, of steel and welded together. One of the plates has a flange at its periphery, which thereby provides, within the flange, a chamber; transducers are carried in the support plate, fluid connected by passages to the chamber. Such construction is, for some purposes, too thick, and also is unduly expensive.

Also known are Menard U.S. Pat. No. 2,957,341, Noel U.S. Pat. No. 3,349,610 and Goodman et al. U.S. Pat. No. 3,446,062, all of which are of cylindrical construction, and therefore of substantial diameter, requiring a relatively large bore hole.

Further, Johnson U.S. Pat. No. 756,644, Holm et al. U.S. Pat. No. 3,792,608 and Johansen U.S. Pat. No. 4,044,608 disclose apparatus which includes a device, such as a screw-operated pump, to force fluid into a chamber in an expansible device, together with a pressure gauge to indicate the pressure of the fluid.

In general, the heretofore known pressure testing apparatus have not been suitable for use in operations where it is desired to obtain quickly and with minimum preparation a determination of the pressure within a material, and in particular do not lend themselves to placement in very thin slots made in material to be tested, as by a saw.

SUMMARY OF THE INVENTION

The present invention is directed to a tester for the pressure within a body, and which is made sufficiently thin that it may be placed in a kerf or slot made by a conventional saw, such as a chain saw, and being particularly suited for use with relatively soft materials, such as those having the hardness of snow and of ice, up to the hardness of soft rock. There is provided a thin metal plate having a thickness at its maximum of the order of five-sixteenth inches. An annular groove is provided in one face of this plate, and the central portion of the plate on the one face, lying within the annular groove, is made of decreased thickness, but of a thickness greater than that of the thickness of the plate at the annular groove. A deformable, elastomeric diaphragm is provided, extending over the reduced thickness central portion of the plate, and over the annular groove, there being provided thereby an expansible chamber between the diaphragm and the central portion of the plate. The peripheral portion of the diaphragm is clamped to the plate by a ring which overlies the groove, and which is secured to the plate by releasable fasteners, the annular plate lying in the noted annular groove and not extending beyond the plane defining the noted face of the plate. A plurality of parallel passages extend from an edge of the plate to the chamber. A supporting structure is provided, including a handle in the form of a hollow rectangular frame and supporting bars extending between and connected to the handle and the plate. The leg of the handle which is closest to the plate has a corresponding plurality of passages in it, and a plurality of conduits extend between and fluid connect the passages in the plate and the passages in the handle.

Among the objects of the present invention are the provision of an expansible chamber tester of extremely thin contruction, suitable for insertion into a kerf made by a saw, to provide such a tester which is of extremely economical construction, and to provide a tester having plural conduits for introduction of fluid into the chamber of the tester.

Other objects and many of the attendant advantages of the present invention will be readily understood from consideration of the following specification, claims and drawings.

DESCRIPTION OF THE PREFERRED EMBODIMENT

Figure 1:
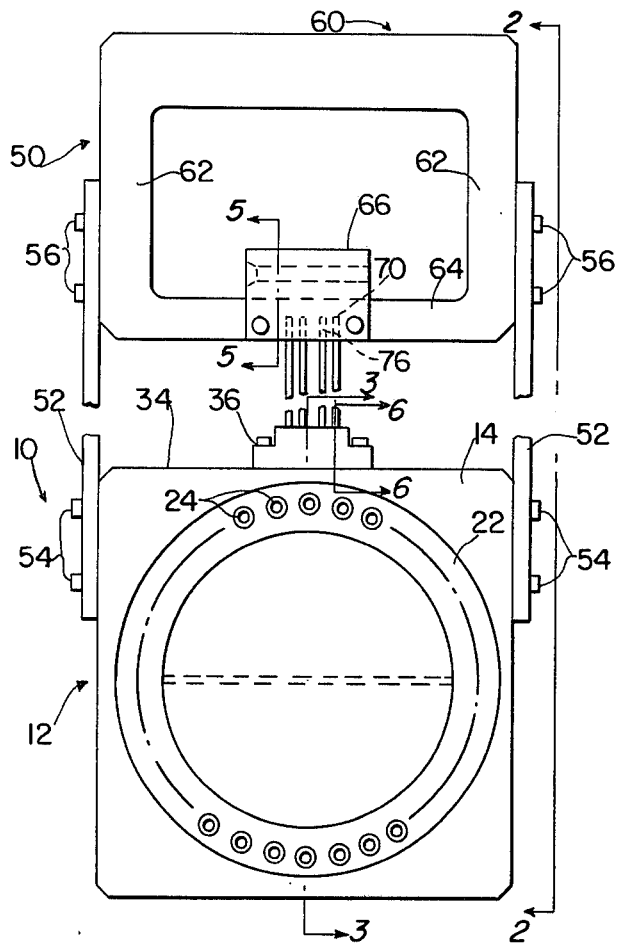
FIG. 1 is an elevational view, with parts removed, of a kerf pressure plate material tester in accordance with the present invention.
Figure 3:
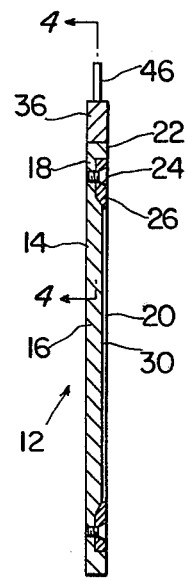
FIG. 3 is an enlarged cross-sectional view taken on the line 3—3 of FIG. 1.

Referring now to the drawings, wherein like or corresponding reference numerals are used to designate like or corresponding parts throughout the several views, there is shown in FIG. 1 a kerf pressure plate material tester apparatus 10, including a tester generally designated 12 and a support structure generally designated 50. As shown in FIG. 3, the tester 12 includes a plate 14 having a thickness, in the preferred embodiment, of approximately five-sixteenth inches at its maximum, which is at the peripheral portions thereof. Plate 14 will therefore be seen to be generally planar, and is preferably of a suitable metal, such as stainless steel. The face 16 thereof is flat, and the opposite face is provided with an annular groove 18 which extends within the periphery of the plate 14. As may be seen from FIG. 1, plate 14 is approximately square plan form. The plate 14 is thinnest at the groove 18, is of intermediate thickness at the central portion 32 lying inwardly of groove 18, and is of greatest thickness at the peripheral portion thereof lying outside of the annular groove 18.

Two grooves, ⅛ inch wide and 0.05 inch deep, are located on surface 32. They are diametral and positioned perpendicular to each other ensuring fluid access to the central area.

A flexible, elastomeric diaphragm 20 extends over the central portion of the plate 14 on the surface opposite surface 16, and also extends at least partially over groove 18. An annular plate or clamping ring 22 is provided, which overlies the annular groove 18 and a plurality of screws 24 extend through openings 26 in the annular plate 22 and are screw threaded into threaded bores 28 in the plate 14. There is thereby provided a chamber 30 between the diaphragm 20 and the central portion 32 of the plate 14. The diaphragm 20 may be of any suitable elastomeric material, such as rubber, or the like, or may in certain instances have associated with it a thin disc of metal or plastic, or may be fabric-reinforced.

Figure 4:
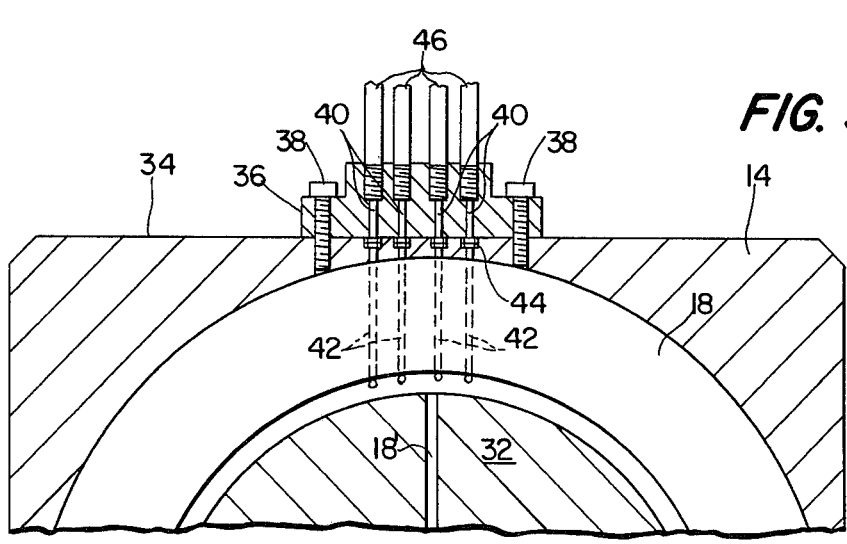
FIG. 4 is an enlarged cross-sectional view taken on the line 4—4 of FIG. 3.
Figure 6:
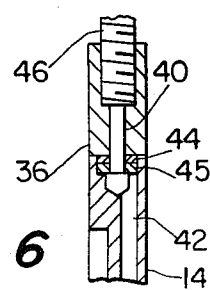
FIG. 6 is an enlarged cross-sectional view taken on the line 6—6 of FIG. 1.

In FIG. 4, there is shown a portion of the pressure plate 14, including the annular groove 18 and the central portion 32 within the annular groove 18. Grooves such as groove 18', extend from groove 18 in the central portion 32 to ensure fluid access in the central area. On the edge 34 of plate 14 there is mounted a seeling boss 36, secured to the plate 14 by bolts 38. Four parallel passages 40 extend through the boss 36 and are in fluid communication with four paralled passages 42 which extend to the surface of the plate 14 which underlies the diaphragm 20 and which forms, with diaphragm 20, the chamber 30. A sealing ring or gasket 44 is provided in each of the passages 42, so as to prevent the leakage of fluid from the juncture of the plate 14 and boss 36. Referring to FIG. 6, there is a metal seal seat ring 45 below the seal 44 providing a compression base over the rearward offset passage 42.

Four tubes extend into the four passages 40 to provide fluid communication to the chamber 30 through the passages 40 and 42.

Figure 2:
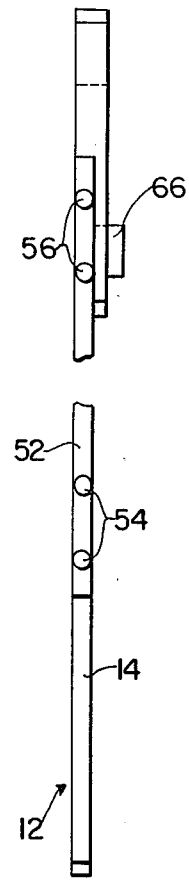
FIG. 2 is a view taken on the line 2—2 of FIG. 1.
Figure 5:
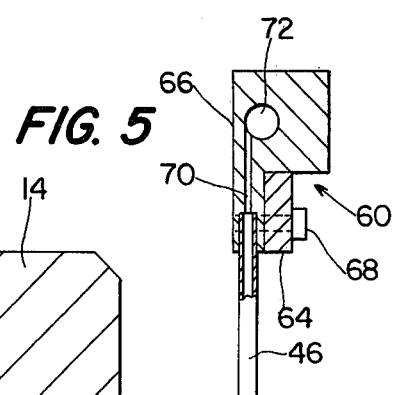
FIG. 5 is an enlarged cross-sectional view taken on the line 5—5 of FIG. 1.

Referring now to FIG. 1, the supporting structure 50 includes a pair of supporting bars 52 which are connected by screws 54 to the sides of the plate 14. As shown in FIG. 2, the support bars 52 are of the same width as the thickness of the plate 14. The support bars 52 are of any suitable length, and are here shown as being broken away. At their upper ends, the support bars 52 are connected by screws 56 to a handle 60 which is in the form of a hollow rectangle. In the preferred form, the width of the handle 60 accommodates a large gloved hand and the support bars 52 extend symmetrically with respect to the center line; these support bars 52 are secured, specifically, to the side legs 62 of the handle 60. The leg 64 of handle 60, which is the leg closest to the plate 14, has a block 66 thereon, preferably formed as a separate part and secured to it by screws 68. Block 66 contains, as shown in FIGS. 1 and 5, four passages 70, and to each of the passages 70 there is fitted an end of a conduit 46. A transverse passage 72 is provided, and this passage provides communication, through suitable flexible hoses, or the like, to a pressure producing device and a gauge, of known construction.

The conduits 46 are parallel to each other, extending into and being fluid connected to and in alignment with the passages 70 in the handle 60 and the passages 40, 42 in the plate 14 and the boss 36 thereof.

In use, a slot or kerf is made in a body of relatively soft material, preferably by a conventional chain saw, the kerf thereby being of approximately five-sixteenth inch width. This kerf may be made, for example, in snow, ice, soft rock, etc., and the tester may be utilized either in the field, or in a laboratory. For example, such a kerf may be made in ice accumulations around piers, ice accumulations in front of dams, and in ice adjacent to ice booms, for testing the pressure thereof. The apparatus 10 is then grasped by the handle 60, and with the supporting structure 50 supporting the tester 12, the latter is positioned in the kerf. If necessary, a negative pressure may be created in the chamber 30, in order to cause the diaphragm 20 to lie within the place defined by the face of the plate 14 opposite face 16 thereof.

Once in position, liquid under pressure is forced into the chamber 30 through passages 72 and 70, conduits 46 and the passages 40 and 42, and pressure measurements are taken in the normal manner. It is of significance that there are provided plural passages and conduits for the pressurizing liquid, since the parallel flow of liquid results in a greater flow of the liquid and a close correlation between the pressure within the chamber 30 and the pressure which is sensed by a pressure guage connected to the fluid system and, preferably, located near the pressure source. The apparatus 10 thereby is highly accurate, and is enabled to be used in connection with testing of relatively soft materials, with the avoidance of the making of relatively large bore holes or cuts in the material to be tested.

The apparatus 10 will be seen to be extremely compact, inexpensive to construct, and relatively easy to use, and avoids the removal of large quantities of material from the material be to tested.

It will be obvious to those skilled in the art that various changes may be made without departing from the spirit of the invention and therefore the invention is not limited to what is shown in the drawings and described in the specification but only as indicated in the appended claims.

I claim:

1. A kerf pressure plate materials tester comprising:
   a generally planar, thin metal plate,
   an annular groove in one face of said plate spaced inwardly from the edge of said plate,
   a deformable diaphragm extending over the central portion of said one face and defining a chamber therebetween and extending at least partially over said annular groove,
   means overlying said groove for clamping the peripheral portion of said diaphragm to said plate, said clamping means lying substantially within the plane defining the said one face, and
   passage means extending through said plate to said chamber.

2. The tester of claim 1, wherein said plate is of greatest thickness at the periphery thereof, is of least thickness at said groove, said central portion thereof being of intermediate thickness.

3. The tester of claim 1, said passage means extending from an edge of said plate to said chamber.

4. The tester of claim 1, said passage means comprising a plurality of passages for admitting fluid into said chamber.

5. The tester of claim 1, said clamping means comprising an annular plate, and removable fastener means for securing said annular plate to said first mentioned plate.

6. The tester of claim 1, and means for supporting said plate having a thickness substantially the same as the thickness of said plate.

7. The tester of claim 6, and supporting means comprising a handle, and support bar means extending between and connected to said handle and to said plate.

8. The tester of claim 7, said handle having passage means therethrough, and conduit means fluid connecting said passage means of said handle to the passage means of said plate.

9. The tester of claim 8, said passage means in said handle comprising a plurality of parallel passages, said conduit means comprising a plurality of parallel conduits each in alignment with a said passage in said handle, and the passage means in said plate comprising plural, parallel passages each having a conduit in frontal alignment therewith.

10. The tester of claim 7, said handle being a hollow rectangular frame having one leg of the frame closest to said tester, and said one leg having passage means therethrough, and conduit means connecting said passage means of said handle to the passage means of said plate.

11. The tester of claim 9, the passage in said plate containing means to seal the handle to plate passageways with front to back passage hole offset.

* * * * *